(12) United States Patent
Yeung et al.

(10) Patent No.: US 8,659,847 B1
(45) Date of Patent: Feb. 25, 2014

(54) COMPONENT REUSE FOR ITI CANCELLATION (75) Inventors: Kwok W. Yeung, Milpitas, CA (US); Kin Man Ng, Cupertino, CA (US); Kin Ming Chan, Milpitas, CA (US)

(73) Assignee: SK hynix memory solutions inc., San Jose, CA (US)

( * ) Notice: Subject to any disclaimer, the term of this patent is extended or adjusted under 35 U.S.C. 154(b) by 146 days.

(21) Appl. No.: 13/368,226

(22) Filed: Feb. 7, 2012

Related U.S. Application Data

(60) Provisional application No. 61/446,897, filed on Feb. 25, 2011.

(51) Int. Cl.
*G11B 5/09* (2006.01)

(52) U.S. Cl.
USPC .................................. 360/53; 360/51; 360/45

(58) Field of Classification Search
USPC ............... 360/53, 51, 45, 48, 39, 55
See application file for complete search history.

(56) References Cited

U.S. PATENT DOCUMENTS

| 8,488,264 | B2* | 7/2013 | Yoshida et al. | 360/51 |
| 2012/0105994 | A1* | 5/2012 | Bellorado et al. | 360/45 |

* cited by examiner

*Primary Examiner* — Ali Neyzari
(74) *Attorney, Agent, or Firm* — Van Pelt, Yi & James LLP (57) ABSTRACT

User level data associated with a location adjacent to a desired location on a magnetic disk storage is received. Media level data associated with the adjacent location is generated based at least in part on the user level data associated with the adjacent location; a processor which is configured to generate the media level data associated with the adjacent location is a same processor which is configured to generate media level data based at least in part on user level data during a write process. The media level data associated with the adjacent location is used to remove inter-track interference (ITI) associated with the adjacent location from a signal read back from the desired location.

21 Claims, 8 Drawing Sheets

COMPONENT REUSE FOR ITI CANCELLATION

CROSS REFERENCE TO OTHER APPLICATIONS

This application claims priority to U.S. Provisional Patent Application No. 61/446,897 entitled ENCODER REUSE FOR ITI CANCELLATION filed Feb. 25, 2011 which is incorporated herein by reference for all purposes.

BACKGROUND OF THE INVENTION

As tracks on magnetic storage disks get closer, the interference from adjacent tracks correspondingly increases. Noise from other tracks when reading back a desired track is referred to as inter-track interference (ITI). One technique to remove ITI from a signal read back from magnetic storage is to read the adjacent track using the read arm and then remove it from the signal read back from the desired track. This technique of reading both a desired track and an adjacent track may be time consuming and/or may require the cooperation of multiple components manufactured by different companies (e.g., because the read arm is controlled by one semiconductor manufactured by a first company and a read process which removes the ITI is performed by a second semiconductor manufactured by a second company), which is undesirable. It would be desirable if new techniques could be developed for ITI cancellation which do not have these and/or other drawbacks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
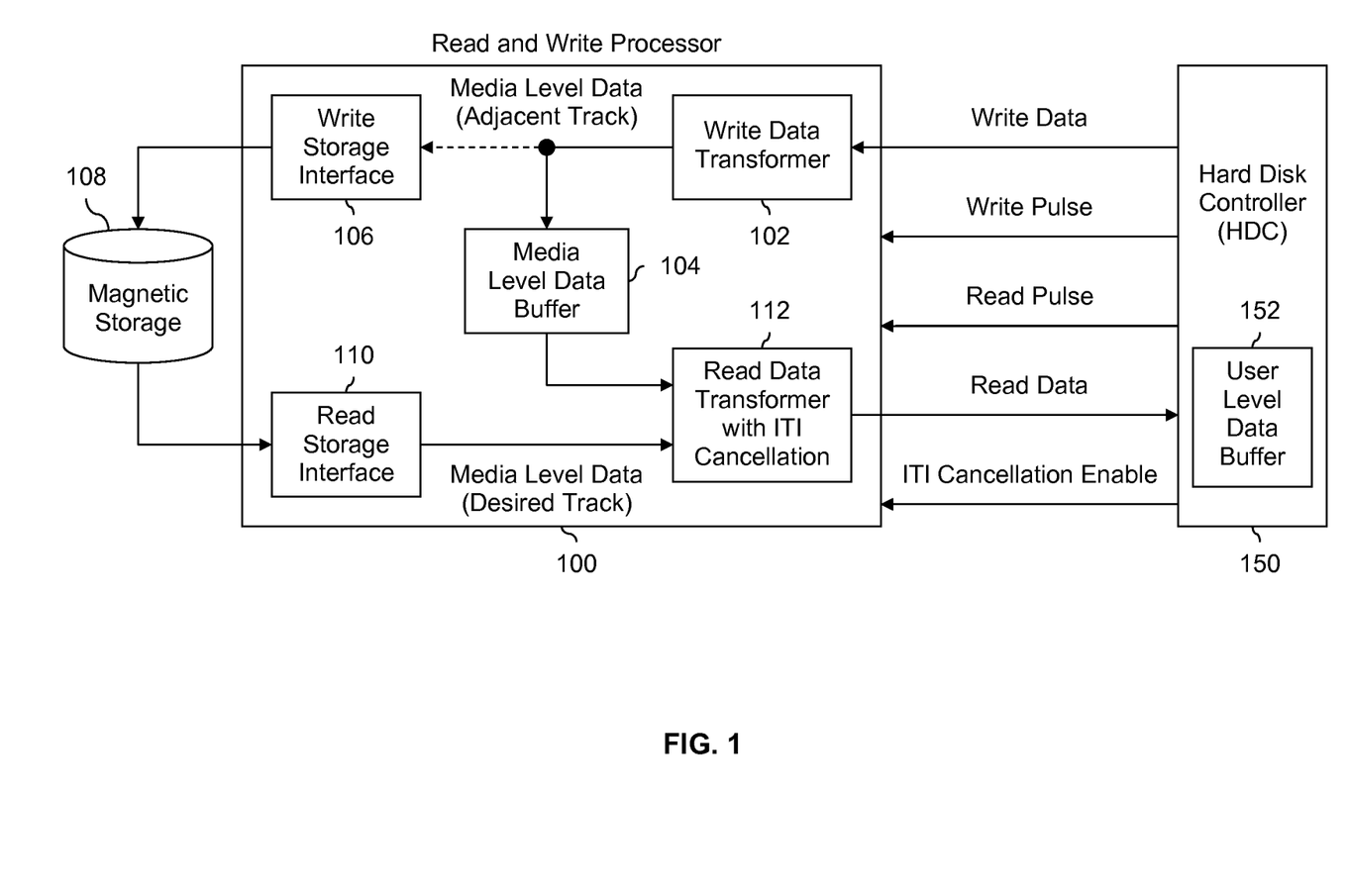
FIG. 1 is a block diagram showing an embodiment of a magnetic storage system which reuses a write data transformer to remove inter-track interference (ITI) which is also used during a write process.

FIG. 1 is a block diagram showing an embodiment of a magnetic storage system which reuses a write data transformer to remove inter-track interference (ITI) which is also used during a write process. In some embodiments, read and write processor 100 is a first functional unit (e.g., an application-specific integrated circuit (ASIC) or a field-programmable gate array (FPGA) or an on-chip logic unit or IP block) and hard disk controller (HDC) 150 is a second functional unit. In some embodiments, read and write processor 100 and HDC 150 are designed by different companies.

The exemplary system shown is configured to perform ITI cancellation during a read process by having HDC 150 provide read and write processor 100 with user level data (if available). User level data refers to the data in the form as it is known to HDC 150. For example, if a spreadsheet is stored on magnetic storage, user level data may include portions of the spreadsheet. HDC 150 provides user level data for a first location in magnetic storage via the write data bus between HDC 150 and write data transformer 102. For example, the user level data provided by HDC 150 may be a user level for a sector or other location adjacent to a desired sector or another location which is to be read next. In some embodiments, the user level data provided to read and write processor 100 is stored in user level data buffer 152. In various embodiments, a variety of handshakes or signaling is used to indicate that data is ready on the write data bus. For example, the write pulse line between HDC 150 and read and write processor 100 may be held high or pulsed.

Write data transformer 102 generates media level data (e.g., for a location which is adjacent to a desired location) using the user level data provided by HDC 150. Media level data refers to the data that is actually stored on magnetic storage 108. For example, if the medial level data is simply the user level data systematically encoded, then write data transformer 102 outputs (as an example) the user level data followed by a checksum or parity. In various embodiments, a variety of transformations are performed by a write data transformer 102, such as encoding (e.g., error correction coding, low-density parity-check (LDPC) encoding, Reed-Solomon encoding, run length limited (RLL) coding, maximum transition run (MTR) coding, etc.), interleaving, etc. These transformation(s) performed by write data transformer 102 during ITI cancellation are the same transformation(s) as those performed during a regular write process. For clarity, write data transformer 102 is shown as a single block but may include a variety of sub-blocks corresponding to underlying processes (e.g., a sub-block for an error correction encoder, a sub-block for an inter-leaver, etc.).

The media level data for a first location (such as a sector which is adjacent or otherwise nearby a desired sector) is output by write data transformer 102 and is stored in media level data buffer 104 until it is accessed by read data transformer 112 for ITI cancellation. The ITI cancellation technique described here is performed during a read process and so in some embodiments the media level data for the adjacent sector (or, more generally, a first location) is not actually written to magnetic storage 108 using write storage interface 106. In contrast, during a write operation, the media level data is written to magnetic storage 108 by write storage interface 106.

To obtain media level data for the desired sector or other location, read storage interface 110 accesses the desired sector in magnetic storage 108. The media level data for the desired sector is passed to read data transformer with ITI cancellation 112. Read data transformer 112 uses the media level data for the adjacent sector stored in media level data buffer 104 to perform ITI cancellation on the media level data for the desired sector before performing the inverse of the transformations performed by write data transformer 102 (e.g., if write data transformer 102 does LDPC encoding, then read data transformer 112 would do LDPC decoding after ITI cancellation). Read data transformer 112 outputs user level data for the desired sector and passes it to HDC 150 via the read data bus.

In various embodiments, read storage interface 110 accesses the desired sector on magnetic storage 108 at a variety of times and/or in response to a variety of triggers. In some embodiments, HDC 150 uses the read pulse line to cause read storage interface 110 to access magnetic storage 108. In some embodiments, read and write processor 100 has a state machine to access magnetic storage 108 at a certain state, for example so that the media level data for the desired sector is ready when the media level data for an adjacent sector is ready. In some embodiments, obtaining media level data for a desired sector occurs in parallel with generation of media level data for an adjacent sector by write data transformer 102.

Read data transformer 112 uses the media level data associated with a first storage location (e.g., a sector adjacent to a sector being read) to perform ITI cancellation on the media level data associated with a second storage location (e.g., the sector being read). In some embodiments, some scaling factor or channel effect is used to model how the media level data associated with the first storage location is perceived at the second storage location (e.g., as a function of distance between two adjacent sectors, strength of the write signal, etc.) prior to being removed. In one example, the amplitude of the media level data from the first location is attenuated to be half as strong and the attenuated media level data signal is removed from the media level data of the location of interest prior to other processing by read data transformer 112 (e.g., prior to error correction decoding, de-interleaving, de-modulation, etc.). In contrast, tracks which are closer together will have stronger interference and read data transformer 112 may perform less attenuation on the signal from the other track before it is removed from the signal read back from the track of interest (i.e., more of the read-back signal from the other track is removed from the read-back signal of the track of interest). In some embodiments, the user level data for the desired track is stored in user level data buffer 152 where it is used in the future to perform a read operation with ITI cancellation for some other track.

Although this figure and some other figures may describe ITI cancellation from a single adjacent track, the ITI cancellation technique described herein is not so limited. In some embodiments, ITI from two other tracks is cancelled out (e.g., ITI from the two tracks on either side of a desired track).

In this example, HDC 150 uses the ITI cancellation enable line between HDC 150 and read and write processor 100 (e.g., by holding the signal high or pulsing it) to indicate to read and write processor 100 that a read operation with ITI cancellation is to be performed. Alternatively, a read operation may be performed without ITI cancellation. In some cases, for example, the system may decide to perform a read without ITI cancellation for one or more initial attempts and only after failing (e.g., to properly decode data stored in a particular location in magnetic storage 108) one or more times is ITI cancellation used. In some other cases, HDC 150 may not have user level data for an adjacent sector available.

One benefit to the example system shown is that write data transformer 102 is repurposed and/or reused logic is also used for write operations. This enables ITI cancellation to be performed while minimizing the amount of new logic that must be added to a chip. In contrast to some other systems which add ITI cancellation using dedicated components (i.e., which are not used for other operations), the amount of new or additional logic is smaller. Additional logic tends to increase the size of a semiconductor, which can be undesirable for small systems, and tends to increase the price of a semiconductor.

Some other systems are configured to perform ITI cancellation by having an HDC store and provide media level data. Compared to the example system shown here, such systems may be unattractive because the HDC is required to store information it may not otherwise store (e.g., because the media level data is meaningless or unintelligible to the HDC or an upper level host which the HDC interfaces with). Furthermore, storing data which an HDC may not typically otherwise store may increase memory requirements for the HDC.

Figure 2:
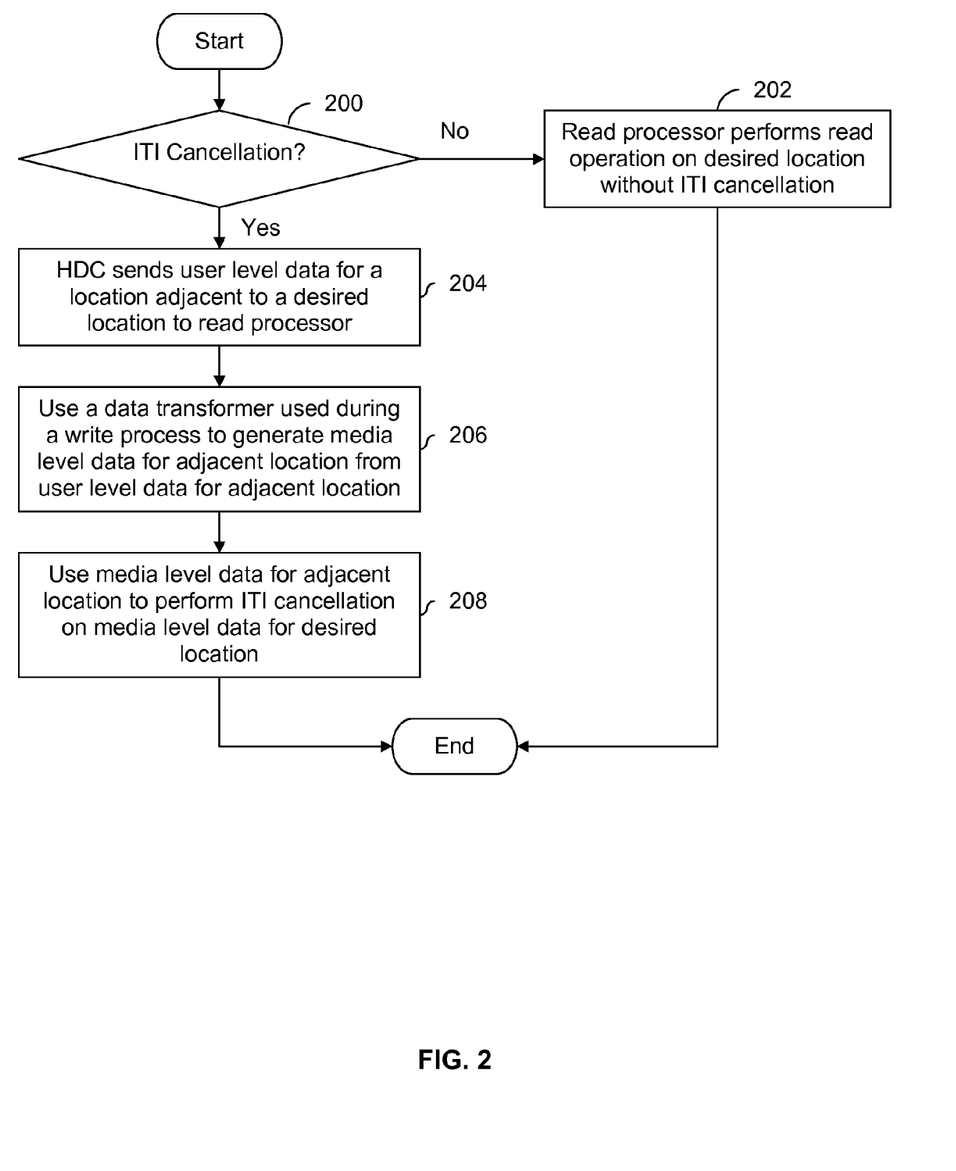
FIG. 2 is a flowchart illustrating an embodiment for a read operation which includes ITI cancellation.

FIG. 2 is a flowchart illustrating an embodiment for a read operation which includes ITI cancellation. At 200, it is determined if a read operation with ITI cancellation is to be performed. For example, in FIG. 1, the ITI cancellation enable line is used to signal a read operation with ITI cancellation by holding the line high or pulsing it. Alternatively, a read operation without ITI cancellation may be indicated by pulsing the read pulse line while holding the ITI cancellation enable signal low. In various embodiments, a variety of handshakes or signaling may be employed.

If it is determined at 200 that ITI cancellation is not to be performed, a read operation is performed by a read processor without ITI cancellation at 202. In FIG. 1, for example, HDC 150 would not provide read and write processor 100 with user level data for an adjacent location and read data transformer 112 would perform error correction decoding and/or other transformations on media level data for a desired location without first performing ITI cancellation.

If it is determined at 200 that ITI cancellation is to be performed, an HDC sends user level data for a location adjacent to a desired location to a read processor at 204. For example, in FIG. 1, HDC 150 may store user level data in user level data buffer 152 as it reads back data from magnetic storage 108; this data is later retrieved and provided to read and write processor 100.

A data transformer used during a write process is used to generate media level data for an adjacent location from user level data for the adjacent location at 206. For example, write data transformer 102 in FIG. 1 may perform LDPC encoding and/or inter-leaving on user level data for an adjacent location; such transformation(s) are also performed by write data transformer 102 on user level data during a write operation.

At 208, media level data for the adjacent location is used to perform ITI cancellation on media level data for a desired location. For example, after being passed through some window or filter (which filters the media level data by adjusting amplitude, phase, etc.), the signal is subtracted from the media level data for the desired location.

The following figures illustrate where 8 sectors associated with 2 tracks are read.

Figure 3:
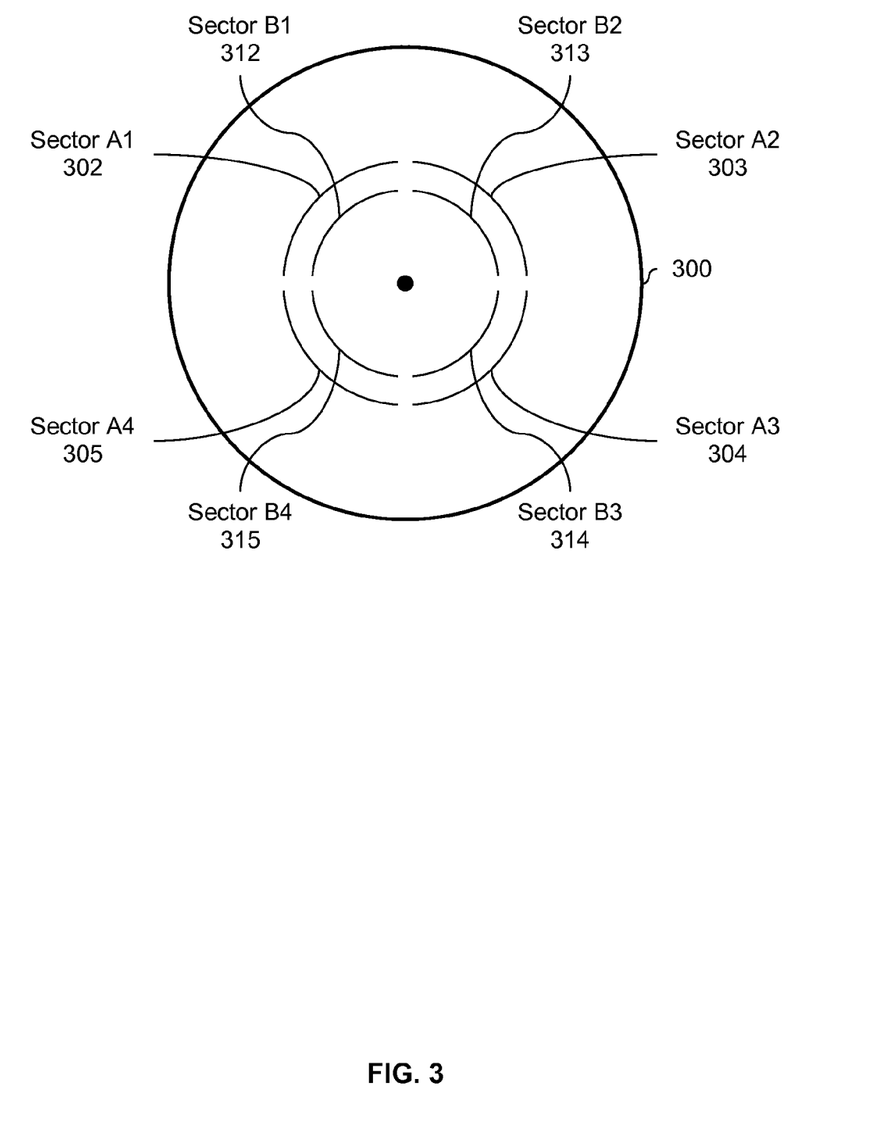
FIG. 3 is a diagram showing an embodiment of sectors on tracks.

FIG. 3 is a diagram showing an embodiment of sectors on tracks. In the example shown, magnetic disk 300 includes a plurality of tracks, including the two tracks shown in this figure. An outer track includes sectors A1-A4 (302-305) and an inner track includes sectors B1-B4 (312-315). The following figures describe an example in which the sectors shown in this figure are read from magnetic disk 300. First, the sectors in the outer track are read, and then the sectors in the inner track are read. In the examples described herein, a read arm moves in a clockwise direction so A1 is read first, then A2, and so on.

Figure 4:
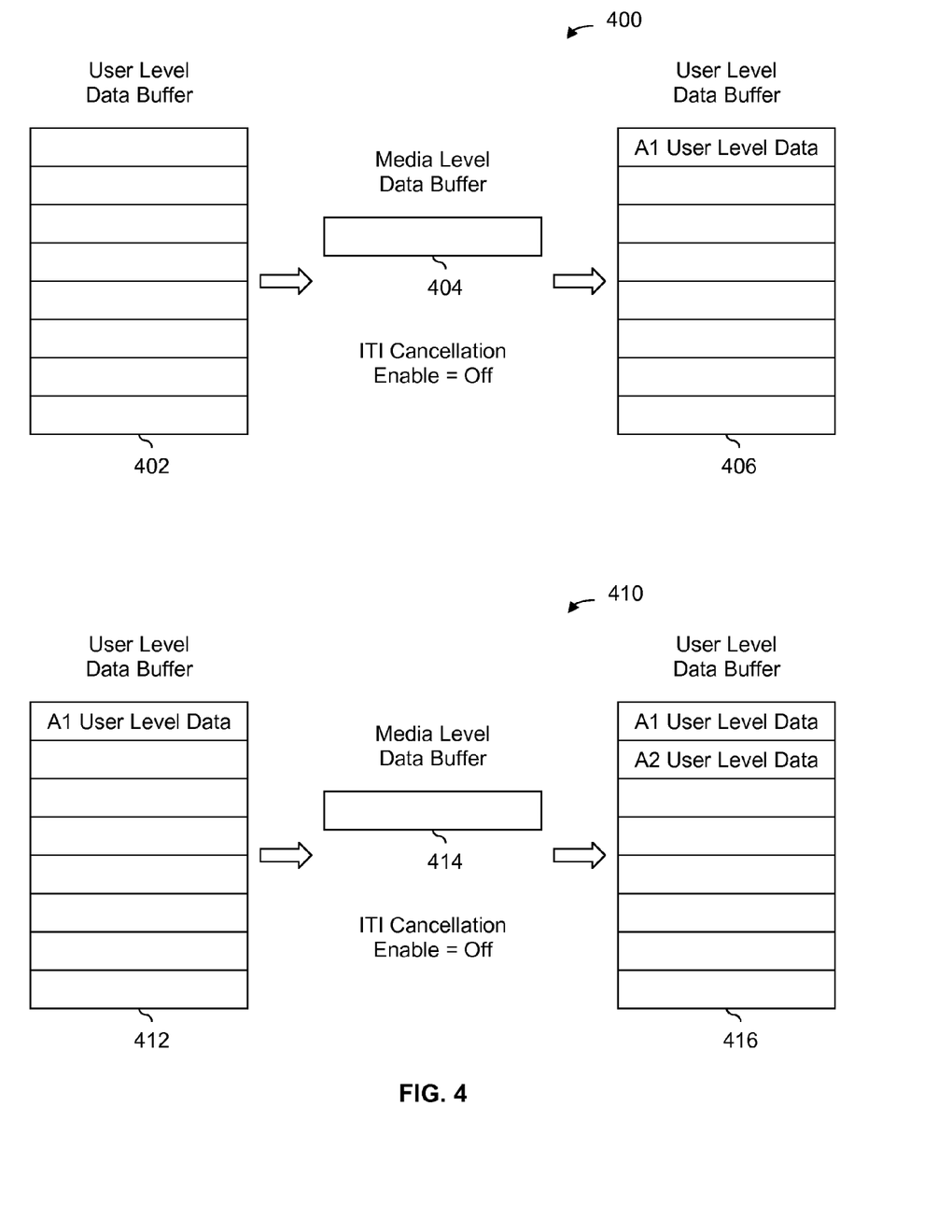
FIG. 4 is a diagram showing an embodiment of a user data buffer and a media data buffer when a first sector and a second sector are read.

FIG. 4 is a diagram showing an embodiment of a user data buffer and a media data buffer when a first sector and a second sector are read. In the example, sectors A1 (302) and A2 (303) from FIG. 3 are read. User level data buffer 402 is associated with and/or used by an HDC. In FIG. 1, for example, buffer 152 is an example of a user level data buffer. In various embodiments, a user data buffer comprises internal storage or external storage.

At 400, sector A1 is the first sector being read and as such user level data buffer 402 is empty. Since there is no user level data available to be used during ITI cancellation, no user level data is passed from an HDC (not shown) to a read processor (not shown). As such, media level data buffer 404 is empty (i.e., since there was no user level data for an adjacent location for which media level data could be generated for ITI cancellation). As such, ITI cancellation is turned off, and user level data at sector A1 is read without performing ITI cancellation. The user level data for sector A1 is stored in user level data buffer 406.

At 410, sector A2 is read. Although user level data buffer 412 contains user level data for sector A1, it is not useful for ITI cancellation when sector A2 is being read. Referring back to FIG. 3, only sector B2 of the sectors shown in that figure contributes ITI to sector A2. As such, the ITI cancellation is turned off and media level data buffer 414 is empty. When user level data for sector A2 is returned (without ITI cancellation having been performed on it), the data is stored in user level data buffer 416.

Figure 5:
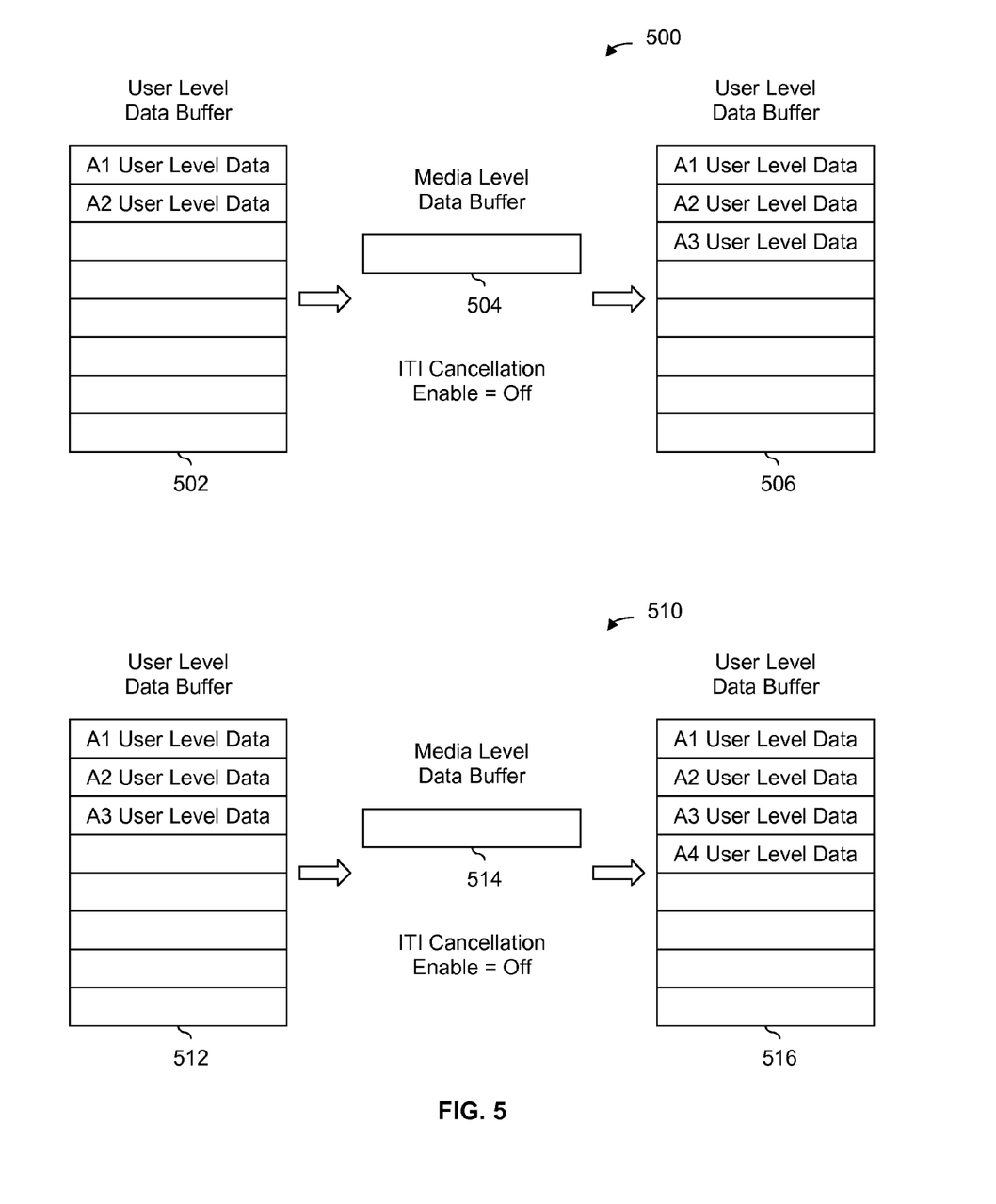
FIG. 5 is a diagram showing an embodiment of a user data buffer and a media data buffer when a third sector and a fourth sector are read.

FIG. 5 is a diagram showing an embodiment of a user data buffer and a media data buffer when a third sector and a fourth sector are read. At 500, sector A3 is read. As in the example shown in FIG. 4, when sector A2 is read, although there is user level data stored in the user level data buffer 502, none of the available data is useful or otherwise applicable for ITI cancellation when sector A3 is read. ITI cancellation is therefore turned off and media level data buffer 504 is empty (since there was no relevant user level data for an adjacent sector from which media level data is generated). User level data for sector A3 is returned (without ITI cancellation) and the data is stored in user level data buffer 506.

At 510, sector A4 is read. As above, none of the user level data stored in user level data buffer 512 is useful for ITI cancellation when reading sector A4 and so no ITI cancellation is performed when reading sector A4.

Figure 6:
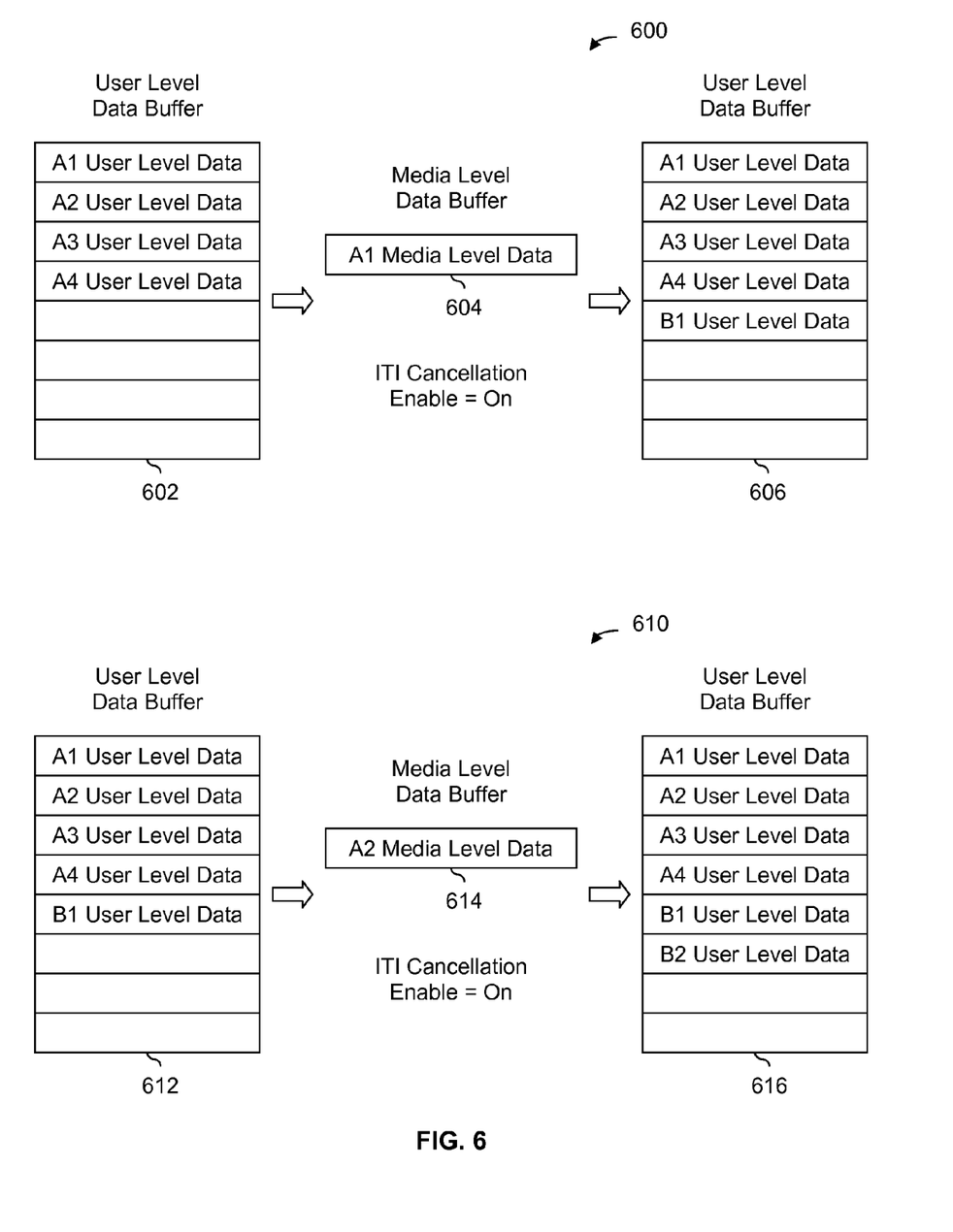
FIG. 6 is a diagram showing an embodiment of a user data buffer and a media data buffer when a fifth sector and a sixth sector are read.

FIG. 6 is a diagram showing an embodiment of a user data buffer and a media data buffer when a fifth sector and a sixth sector are read. At 600, sector B1 is read. Referring back to FIG. 3, sector A1 contributes ITI to sector B1 and user level data for that sector is stored in user level data buffer 602. Therefore, at 600, ITI cancellation is performed and user level data for sector A1 is obtained from user level data buffer 602 and is passed to a write data transformer (not shown) which performs the transformation to make user level data into media level data. The media level data for adjacent sector A1 is stored in media level data buffer 604. This media level data for sector A1 is used to remove ITI from the media level data for sector B1; after ITI cancellation is performed the ITI corrected media level data is turned into user level data. This user level data for sector B1 (with ITI cancellation performed on it) is stored in user level data buffer 606.

At 610, sector B2 is read. As in 600, the user level data buffer contains data for an adjacent sector which can be used for ITI cancellation. User level data for sector A2 is obtained from user level data buffer 612, from which media level data for sector A2 is generated and stored in media level data buffer 614. ITI cancellation is then performed on the media level data for sector B2 using the media level data for sector A2 stored in buffer 614. The generated user level data for sector B2 (with ITI cancellation performed on it) is stored in user level data buffer 616.

Figure 7:
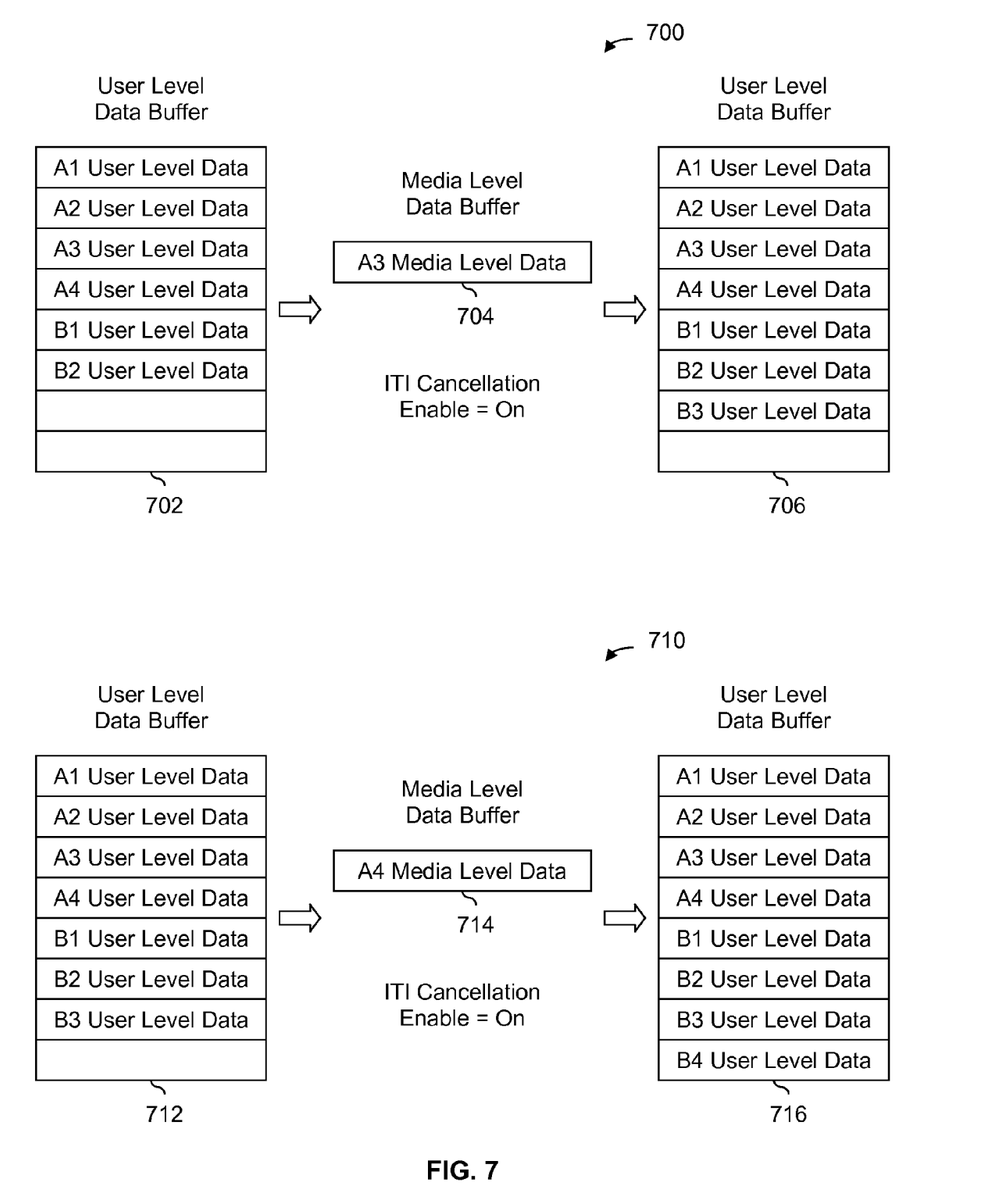
FIG. 7 is a diagram showing an embodiment of a user data buffer and a media data buffer when a seventh sector and an eighth sector are read.

FIG. 7 is a diagram showing an embodiment of a user data buffer and a media data buffer when a seventh sector and an eighth sector are read. At 700, sector B3 is read. Sector A3 contributes ITI to sector B3, so user level data for sector A3 is accessed from user level data buffer 702 and is used to generate media level data which is stored in media level data buffer 704. Similarly, when sector B4 is read at 710, user level data for sector A4 is used to remove ITI from the media level data stored in sector B4. After reading all of the sectors shown in FIG. 3, user level data buffer 716 contains user level data for sectors A1-A4 (which were read without ITI cancellation) and B1-B4 (which were read with ITI cancellation).

Figure 8:
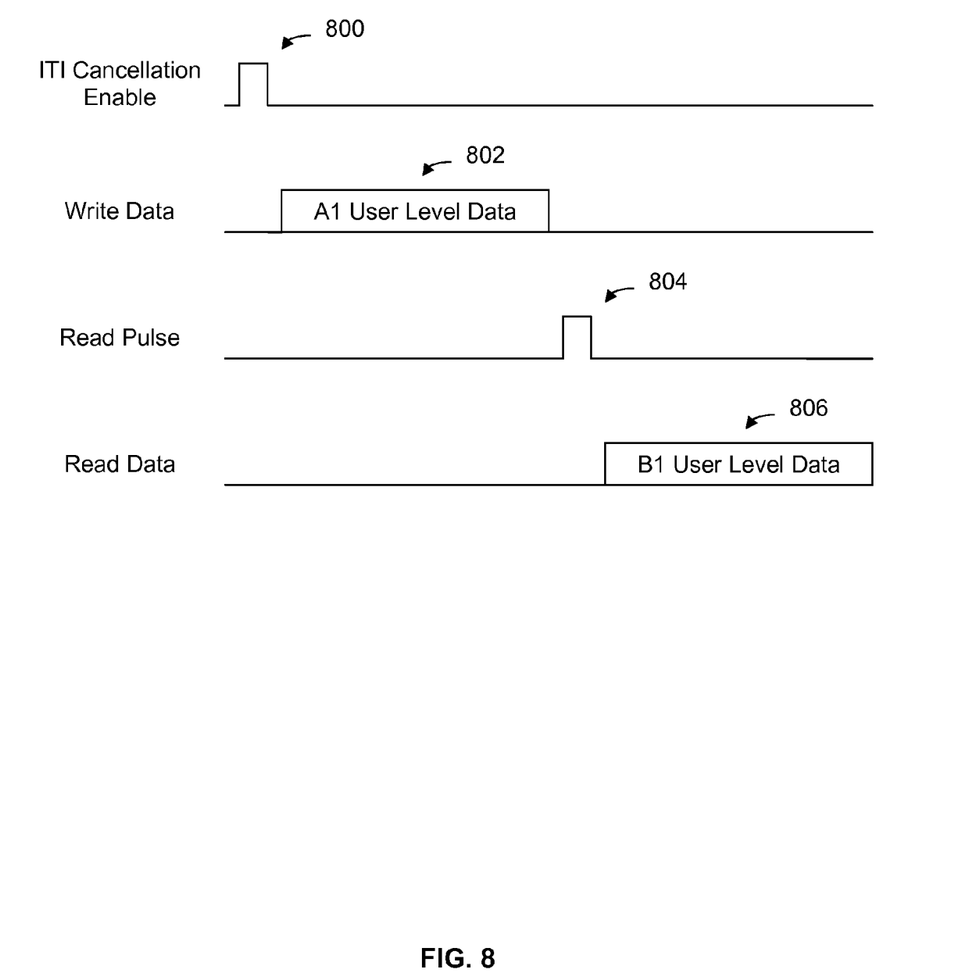
FIG. 8 is a waveform showing an embodiment of information exchanged between a read and write processor and an HDC when a read process with ITI cancellation is performed.

FIG. 8 is a waveform showing an embodiment of information exchanged between a read and write processor and an HDC when a read process with ITI cancellation is performed. In the example shown, the information exchanged is associated with the read shown in 600 of FIG. 6. Referring to the example of FIG. 1, in some embodiments, the signals shown are exchanged between read and write processor 100 and HDC 150. At 800, the ITI cancellation enable line is pulsed to indicate a read with ITI cancellation is to be performed. In some embodiments, to indicate a read without ITI cancellation is to be performed, a read pulse line (not shown) may be pulsed. At 802, the HDC provides the user level data for location A1 to the read and write processor. In some embodiments, the devices have previously agreed upon timing between the ITI cancellation enable pulse at 800 and the user level data for location A1 provided at 802. For example, there may be a guaranteed window during which the HDC guarantees that the write data bus will have the proper information, thus permitting the read and write controller to know during what window of time the write data bus should be sampled. At 804, the read pulse line is pulsed. In some embodiments, this signal is used (at least during read operations with ITI cancellation) for timing purposes as opposed to signaling functionality or operations. Put another way, the ITI cancellation enable signal at 800 already signals that a read operation (as opposed to a write operation) is to be performed, and so the read pulse at 804 in some embodiments is used to control timing so that the HDC and read and write processor both know when to exchange the user level data for the desired location, as opposed to using the read pulse signal to signal a read operation versus a write operation. At 806, the user level data for the desired location (i.e., B1) is returned. As with information exchanged on the write data bus, in some embodiments, there is some predefined timing between the read pulse and the read data so that the read and write processor and the HDC know when to drive and sample, respectively, the read data bus.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for inter-track interference (ITI) cancellation, comprising:
    an interface configured to receive user level data associated with a location adjacent to a desired location on a magnetic disk storage; and
    a processor configured to:
        generate media level data associated with the adjacent location based at least in part on the user level data associated with the adjacent location, wherein the processor which is configured to generate the media level data associated with the adjacent location is a same processor which is configured to generate media level data based at least in part on user level data during a write process; and
        use the media level data associated with the adjacent location to remove inter-track interference (ITI) associated with the adjacent location from a signal read back from the desired location.

2. The system recited in claim 1, wherein the adjacent location is associated with a first track on the magnetic disk storage, the desired location is associated with a second track on the magnetic disk storage, and the first track and the second track are adjacent to each other on the magnetic disk storage.

3. The system recited in claim 1, wherein:
    the processor is configured to perform the steps of generating and using during a read operation; and
    the media level data associated with the adjacent location is not written to the magnetic disk storage during the read operation.

4. The system recited in claim 1, wherein the processor is configured to generate media level data associated with the adjacent location, including by performing one or more of the following: encoding, error correction encoding, low-density parity-check (LDPC) encoding, Reed-Solomon encoding, run length limited (RLL) coding, maximum transition run (MTR) coding, or interleaving.

5. The system recited in claim 1, wherein the user level data associated with the adjacent location is received from a hard disk controller (HDC).

6. The system recited in claim 1, wherein:
    the interface is further configured to receive an ITI cancellation enable signal; and
    in the event the ITI cancellation enable signal indicates ITI cancellation is not to be performed, the processor is configured to not generate the media level data associated with the adjacent location and to not use the media level data associated with the adjacent location to remove ITI associated with the adjacent location.

7. The system recited in claim 1, wherein the interface is further configured to provide user level data associated with the desired location, wherein the user level data associated with the desired location has ITI associated with the adjacent location removed.

8. The system recited in claim 1, wherein the interface is configured to provide the user level data associated with the desired location in response to receiving a signal associated with a read operation.

9. A method for inter-track interference (ITI) cancellation, comprising:
    receiving user level data associated with a location adjacent to a desired location on a magnetic disk storage;
    using a processor to generate media level data associated with the adjacent location based at least in part on the user level data associated with the adjacent location, wherein the processor which is configured to generate the media level data associated with the adjacent location is a same processor which is configured to generate media level data based at least in part on user level data during a write process; and
    using the media level data associated with the adjacent location to remove inter-track interference (ITI) associated with the adjacent location from a signal read back from the desired location.

10. The method recited in claim 9, wherein the adjacent location is associated with a first track on the magnetic disk storage, the desired location is associated with a second track on the magnetic disk storage, and the first track and the second track are adjacent to each other on the magnetic disk storage.

11. The method recited in claim 9, wherein:
    using the processor and using the media level data are performed during a read operation; and
    the media level data associated with the adjacent location is not written to the magnetic disk storage during the read operation.

12. The method recited in claim 9, wherein using the processor includes performing one or more of the following: encoding, error correction encoding, low-density parity-check (LDPC) encoding, Reed-Solomon encoding, run length limited (RLL) coding, maximum transition run (MTR) coding, or interleaving.

13. The method recited in claim 9, wherein the user level data associated with the adjacent location is received from a hard disk controller (HDC).

14. The method recited in claim 9, wherein:
    the method further includes receiving an ITI cancellation enable signal; and
    in the event the ITI cancellation enable signal indicates ITI cancellation is not to be performed, the steps of using the processor and using the media level data are not performed.

15. The method recited in claim 9 further including providing user level data associated with the desired location, wherein the user level data associated with the desired location has ITI associated with the adjacent location removed.

16. The method recited in claim 9, wherein providing the user level data associated with the desired location is performed in response to receiving a signal associated with a read operation.

17. A computer program product for inter-track interference (ITI) cancellation, the computer program product being embodied in a tangible non-transitory computer readable storage medium and comprising computer instructions for:

receiving user level data associated with a location adjacent to a desired location on a magnetic disk storage;

generating media level data associated with the adjacent location based at least in part on the user level data associated with the adjacent location, wherein a processor which is configured to generate the media level data associated with the adjacent location is a same processor which is configured to generate media level data based at least in part on user level data during a write process; and using the media level data associated with the adjacent location to remove inter-track interference (ITI) associated with the adjacent location from a signal read back from the desired location.

18. The computer program product recited in claim 17, wherein the adjacent location is associated with a first track on the magnetic disk storage, the desired location is associated with a second track on the magnetic disk storage, and the first track and the second track are adjacent to each other on the magnetic disk storage.

19. The computer program product recited in claim 17, wherein:

the computer instructions for generating media level data and using the media level data are performed during a read operation; and the media level data associated with the adjacent location is not written to the magnetic disk storage during the read operation.

20. The computer program product recited in claim 17, wherein the computer instructions for generating media level data include computer instructions for performing one or more of the following: encoding, error correction encoding, low-density parity-check (LDPC) encoding, Reed-Solomon encoding, run length limited (RLL) coding, maximum transition run (MTR) coding, or interleaving.

21. The computer program product recited in claim 17, wherein the user level data associated with the adjacent location is received from a hard disk controller (HDC).

* * * * *

UNITED STATES PATENT AND TRADEMARK OFFICE
CERTIFICATE OF CORRECTION

| | | |
|---|---|---|
| PATENT NO. | : 8,659,847 B1 | Page 1 of 1 |
| APPLICATION NO. | : 13/368226 | |
| DATED | : February 25, 2014 | |
| INVENTOR(S) | : Yeung et al. | |

It is certified that error appears in the above-identified patent and that said Letters Patent is hereby corrected as shown below:

In the claims

Column 8, line 66, claim 17, delete "tangible".

Signed and Sealed this
Ninth Day of February, 2016

Michelle K. Lee
*Director of the United States Patent and Trademark Office*